United States Patent
Katou

(10) Patent No.: US 6,676,563 B2
(45) Date of Patent: Jan. 13, 2004

(54) SEMI-AUTOMATIC TRANSMISSION

(75) Inventor: Yoshiaki Katou, Kanagawa (JP)

(73) Assignee: Jatco LTD, Fuji (JP)

( * ) Notice: Subject to any disclaimer, the term of this patent is extended or adjusted under 35 U.S.C. 154(b) by 0 days.

(21) Appl. No.: 10/201,197

(22) Filed: Jul. 24, 2002

(65) Prior Publication Data

US 2003/0019709 A1 Jan. 30, 2003

(30) Foreign Application Priority Data

Jul. 25, 2001 (JP) .......................................... 2001-224901

(51) Int. Cl.[7] .............................................. B60K 41/02
(52) U.S. Cl. ........................................... 477/78; 74/335
(58) Field of Search ............................. 477/78; 74/333, 74/335

(56) References Cited

U.S. PATENT DOCUMENTS 4,646,891 A * 3/1987 Braun .......................... 477/78
5,943,911 A * 8/1999 Beckerman ................. 74/333

FOREIGN PATENT DOCUMENTS

| JP | 50-132359 | 10/1975 |
| JP | 54-28894 | 9/1979 |
| JP | 5-99333 | 4/1993 |

* cited by examiner

*Primary Examiner*—Dirk Wright
(74) *Attorney, Agent, or Firm*—Foley & Lardner

(57) ABSTRACT

A semi-automatic transmission comprises an input shaft; a countershaft; constantly meshed gears arranged between the input shaft and the countershaft; and an electrically controlled dog clutch operatively disposed on one the input shaft and the countershaft. The dog clutch is of a type which is free of a synchronizing mechanism and fastens one of the meshed gears to a corresponding one of the input shaft and the countershaft when operated, thereby to establish a given torque transmission path from the input shaft to the countershaft. An electromagnetic multiple disc clutch is employed, which has an input part adapted to be driven by an engine and an output part connected to the input shaft. A control unit is further employed, which controls the dog clutch in accordance with information signals applied thereto.

20 Claims, 4 Drawing Sheets

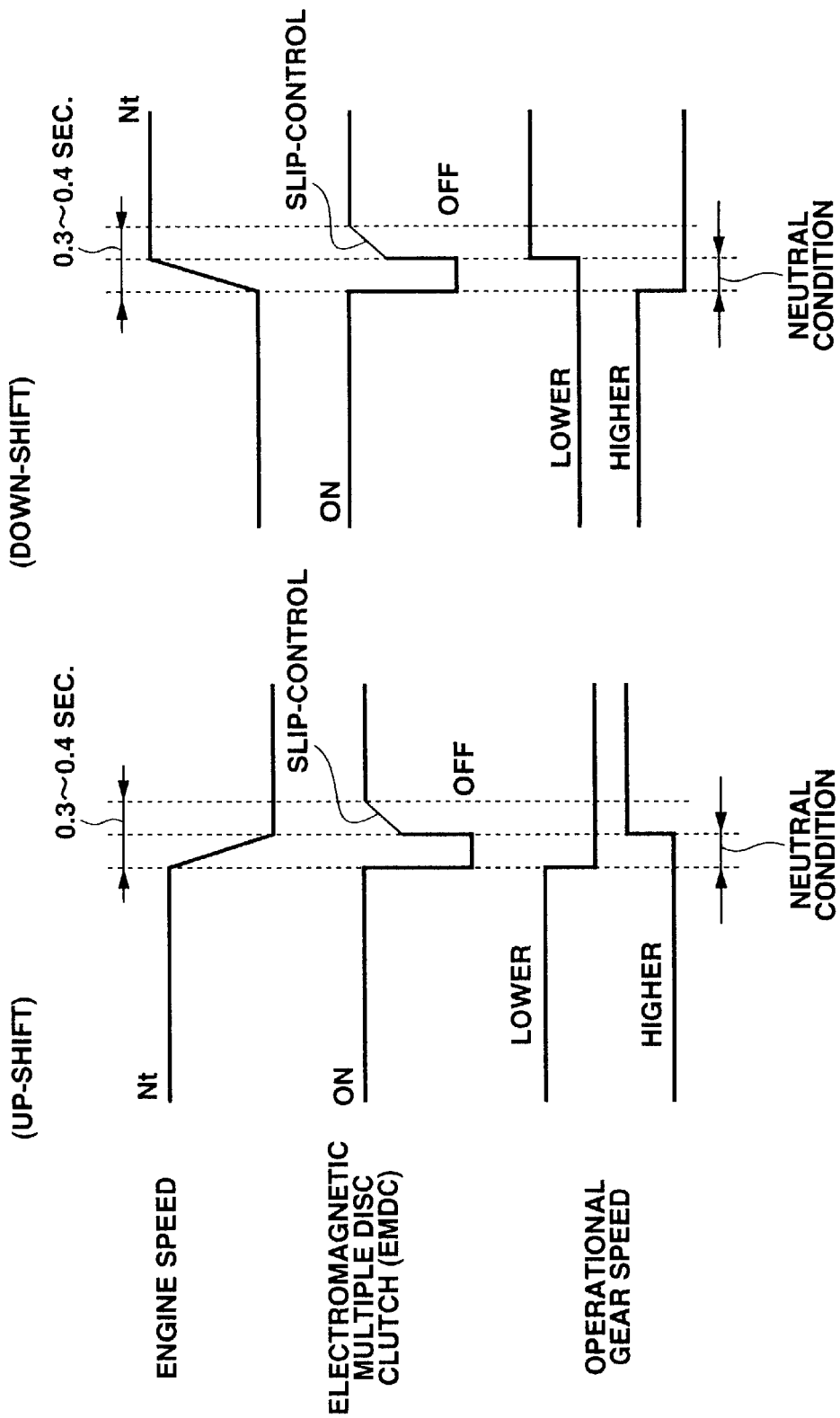

SEMI-AUTOMATIC TRANSMISSION

BACKGROUND OF THE INVENTION

1. Field of the Invention

The present invention relates in general to transmissions of wheeled motor vehicles, and more particularly to the transmissions of a semi-automatic type which provides the transmission with a synchronized gear change operation by the work of an electromagnetic multiple disc clutch.

2. Description of Related Art

In order to clarify the task of the present invention, transmissions shown in Japanese Patent Second Provisional Publication (Tokkou-sho) 54-28894 and Japanese Patent First Provisional Publication (Tokkai-hei) 5-99333 will be briefly described in the following.

In the former publication, there is shown a so-called constantly gear meshed transmission equipped with a synchronizing system which is provided at one end of a countershaft of the transmission. A first gear tightly disposed on an output shaft is constantly meshed with a second gear which is rotatably disposed on the countershaft. The synchronizing system is constructed to decelerate or accelerate the second gear to establish rotation synchronization of the two shafts before a selected dog clutch effects engagement of a corresponding speed gear with the output shaft.

In the latter publication, there is shown another constantly gear meshed transmission equipped with a synchronizing system which is constructed to establish a rotation synchronization of the countershaft and output shaft (viz., main shaft) only in the lowest and highest gear changes. More specifically, only the dog clutches for the lowest and highest operation gear speeds are equipped with a synchronizing mechanism.

SUMMARY OF THE INVENTION

However, due to the following reasons, the transmissions of the above-mentioned publications have failed to provide users or car makers with a satisfaction.

That is, in the transmission of former publication, the synchronizing system provided at one end of the countershaft induces enlargement of the transmission in an axial direction and increase in weight of the transmission, which inevitably bring about a difficulty with which the transmission is mounted onto a given limited space of the vehicle body.

While, in the transmission of latter publication, when a gear change other than the lowest and highest gear changes is needed, the synchronizing mechanism of either one of the dog clutches for the lowest and highest operational gear speeds has to be indirectly used, which however increases the time needed for establishing the rotation synchronization between the countershaft and the output shaft. If the needed time for the synchronization is excessively large, an engine roar tends to occur.

In general, the manual transmissions of the above-mentioned constantly gear meshed type are equipped with a dry type clutch for connecting the transmission input shaft with an output member of the engine, and the dry type clutch is actuated by a hydraulic actuator. Thus, operation of the clutch (viz., engagement/disengagement operation) is inevitably affected by a temperature of hydraulic oil in the actuator and by a surge pressure appearing upon engagement of the clutch, which tends to make a responsive operation of the clutch difficult.

Accordingly, it is an object of the present invention to provide a semi-automatic transmission which is free of the above-mentioned shortcomings.

According to a first aspect of the present invention, there is provided a semi-automatic transmission which comprises an input shaft; a countershaft; constantly meshed gears arranged between the input shaft and the countershaft; an electrically controlled dog clutch operatively disposed on one the input shaft and the countershaft, the dog clutch being of a type free of a synchronizing mechanism and fastening one of the meshed gears to a corresponding one of the input shaft and the countershaft when operated, thereby to establish a given torque transmission path from the input shaft to the countershaft; a control unit which controls the dog clutch in accordance with information signals applied thereto; and an electromagnetic multiple disc clutch having an input part adapted to be driven by an engine and an output part connected to the input shaft.

According to a second aspect of the present invention, there is provided a semi-automatic transmission which comprises an input shaft having a first group of gears rotatably disposed thereon; a countershaft having a second group of gears tightly disposed thereon, said second group of gears being constantly and respectively engaged with said first group of gears; an electrically controlled dog clutch operatively disposed on said input shaft, said dog clutch functioning to fasten one of said first group of gears to said input shaft when operated; an electromagnetic multiple disc clutch having an input part adapted to be driven by an engine and an output part connected to said input shaft; and a control unit which controls both said dog clutch and said electromagnetic multiple disc clutch upon receiving a gear change instruction.

According to a third aspect of the present invention, there is provided a semi-automatic transmission which comprises an input shaft having a first group of gears rotatably disposed thereon and a third group of gears tightly disposed thereon; a countershaft having a second group of gears tightly disposed thereon and a fourth group of gears rotatably disposed thereon, the second and fourth groups of gears being constantly and respectively engaged with the first and third groups of gears; an electrically controlled first dog clutch operatively disposed on the input shaft, the first dog clutch functioning to fasten one of the first group of gears to the input shaft when operated; an electrically controlled second dog clutch operatively disposed on the countershaft, the second dog clutch functioning to fasten one of the third group of gears to the countershaft when operated; a wet type electromagnetic multiple disc clutch having an input part adapted to be driven by an engine and an output part connected to the input shaft; and a control unit which controls the first and second dog clutches and the electromagnetic multiple disc clutch upon receiving a gear change instruction, wherein the wet type electromagnetic multiple disc clutch comprises an input drum adapted to be driven by the engine; an input clutch hub connected to the input shaft to rotate therewith; an annular main clutch selectively assuming an engine condition wherein the input drum and the input clutch hub are engaged and a disengaged condition wherein the input drum and the input clutch hub are disengaged; an annular pilot clutch which selectively assumes an engaged condition and a disengaged condition; and an annular cam mechanism which forces the annular main clutch to assume the engaged condition when the annular pilot clutch assumes the engaged condition, wherein the annular pilot clutch and the annular cam mechanism are concentrically received within the annular main clutch with respect to an axis of the input shaft.

BRIEF DESCRIPTION OF THE DRAWINGS

Other objects and advantages of the present invention will become apparent from the following description when taken in conjunction with the accompanying drawings, in which:

FIGS. 4A and 4B are time charts showing operation manner of various elements with respect to elapsed time.

DETAILED DESCRIPTION OF THE INVENTION

In the following, the present invention will be described in detail with reference to the accompanying drawings. For ease of understanding, various directional terms, such as, right, left, upper, lower, rightward and the like are used in the description. However, such directional terms are to be understood with respect to only a drawing or drawings on which the corresponding part or portion is illustrated.

Figure 1:
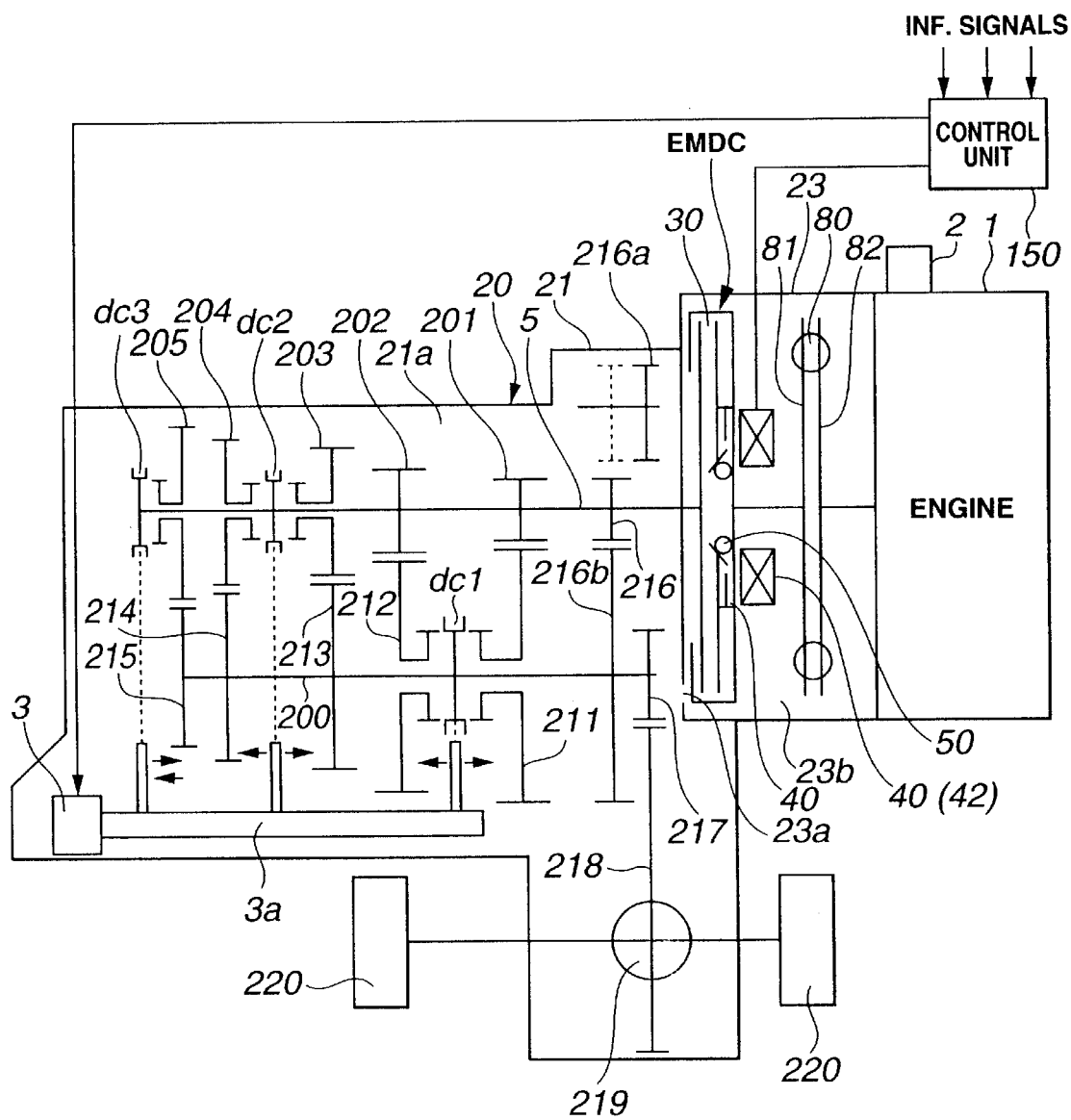
FIG. 1 is a schematic view of a semi-automatic transmission according to the present invention.
Figure 2:
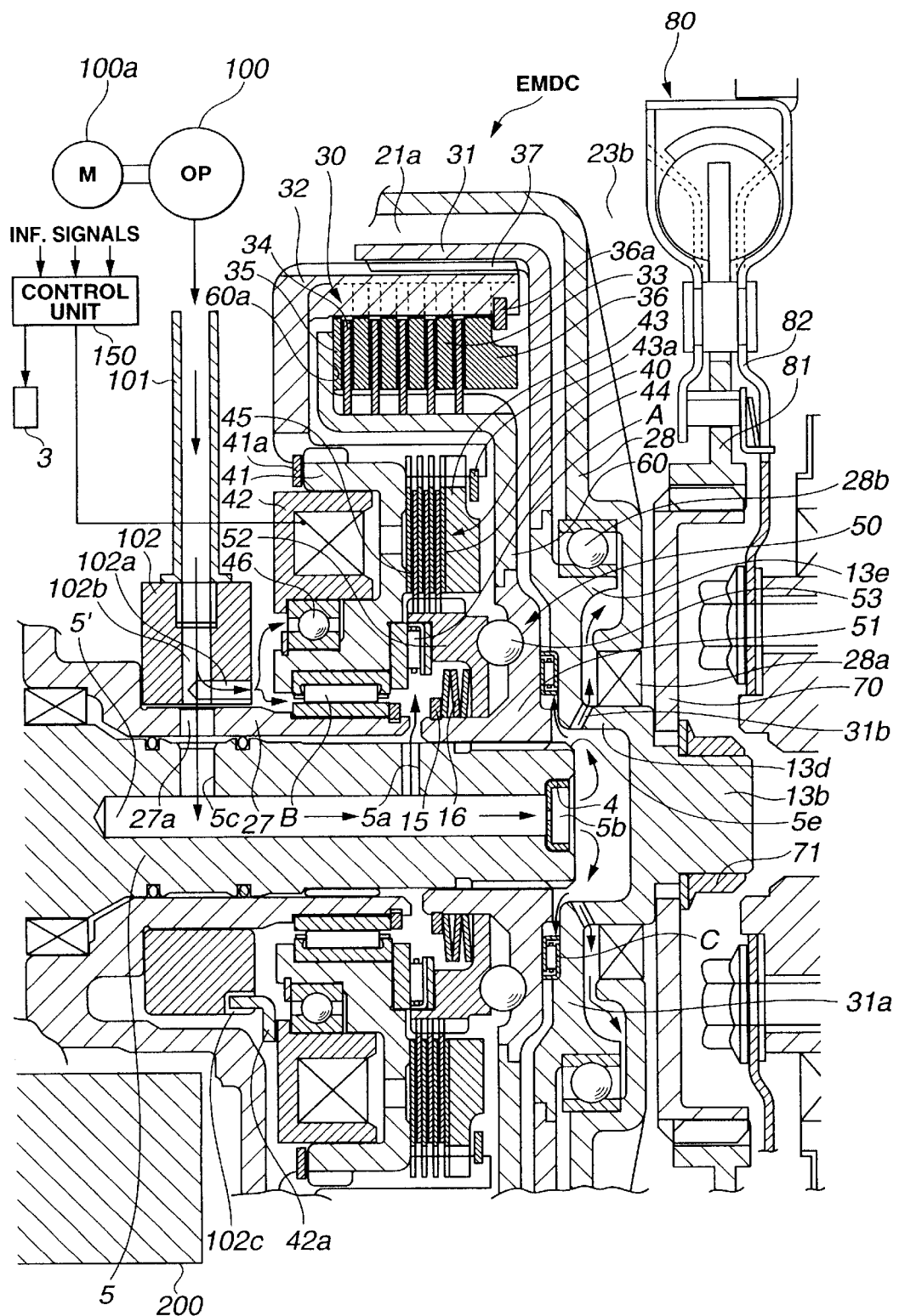
FIG. 2 is a partial sectional view of an electromagnetic multiple disc clutch employed in the present invention.

Referring to FIGS. 1 and 2, particularly FIG. 1, there is schematically shown a semi-automatic transmission according the present invention.

Denoted by numeral 1 is an internal combustion engine which drives or powers the transmission. Denoted by numeral 2 is a throttle actuator which actuates a throttle valve (not shown) of the engine 1.

Denoted by numeral 20 is a multi-gear transmission proper which is housed in a transmission case 21. Denoted by numeral 23 is a clutch housing which is mounted to a front open end of the transmission case 21.

Within the clutch housing 23, there is defined a first container chamber 23b in which a torsional damper 80 is installed. As will become apparent as the description proceeds, for defining the first container chamber 23b, a front cover 28 (see FIG. 2) is bolted to the clutch housing 23. The interior of the first container chamber 23b is communicated with the open air.

Referring back to FIG. 1, within the transmission case 21, there is defined a second container chamber 21a. For defining the second container chamber 21a, a part of the clutch housing 23 and a part of the front cover 28 are secured to the transmission case 21.

Denoted by numeral 5 is an input shaft which extends longitudinally in the transmission case 21. As shown, the input shaft 5 has a front end portion projected into the clutch housing 23.

The front end portion of the input shaft 5 is incorporated with a wet type electromagnetic multiple disc clutch EMDC which is installed in the clutch housing 23.

As will be described in detail hereinafter, the electromagnetic multiple disc clutch EMDC comprises generally an annular main clutch 30, an annular pilot clutch 40 installed within the annular main clutch 30 and an annular cam mechanism 50 installed within the annular pilot clutch 40.

As shown, to the input shaft 5, there are mounted a reverse drive gear 216, first to fifth drive gears 201, 202, 203, 204 and 205, a third/fourth gear switching dog clutch dc2 and a fifth gear switching dog clutch dc3. As shown, the reverse drive gear 216 and first and second drive gears 201 and 202 are secured to the input shaft 5 to rotate together therewith like a single unit, while the third, fourth and fifth drive gears 203, 204 and 205 are rotatably disposed about the input shaft 5. The reverse drive gear 216 is engageable with a reverse counter gear 216a which can be axially shifted.

A countershaft 200 extends in parallel with the input shaft 5 in the transmission case 21. To the countershaft 200, there are mounted first to fifth driven gears 211, 212, 213, 214 and 215, a first/second gear switching dog clutch dc1, a reverse driven gear 216b meshed with the reverse counter gear 216a, and a speed reduction gear 217. As shown, the first and second driven gears 211 and 212 are rotatably disposed about the countershaft 200, while the third, fourth and fifth driven gears 213, 214 and 215, the reverse driven gear 216b and the speed reduction gear 217 are secured to the countershaft 200 to rotate together therewith like a single unit.

The first/second gear switching dog clutch dc1, the third/fourth gear switching dog clutch dc2 and the fifth gear switching dog clutch dc3 are moved by a shift drum 3a driven by a pulse motor 3 which is controlled by a control unit 150. Although not shown in the drawings, into the control unit 150, there are inputted various known information signals for controlling the dog clutches dc1, dc2 and dc3 in a well-timed manner.

It is to be noted that the multi-gear transmission proper 20 has not conventional synchro-mesh units, and thus the transmission proper 20 can be reduced in axial length.

Referring to FIG. 2, there is shown the detail of the electromagnetic multiple disc clutch EMDC and its surrounding parts.

As shown, the electromagnetic multiple disc clutch EMDC is arranged to receive an engine power from the torsion damper 80 through an input hub 70.

The annular main clutch 30 of the disc clutch EMDC comprises a first input drum 31 which is a cylindrical bottomed member. The first input drum 31 has a projected center portion 13b to which the input hub 70 is connected by means of a spline connection. The first input drum 31 has further a smaller diameter cylindrical portion 13d which is slidably held by an oil seal member 28a and a cylindrical bearing supporting portion 13e which receives a bearing 28b in cooperation with the front cover 28.

The annular main clutch 30 further comprises a second input drum 32 which has a double wall construction. An outer cylindrical wall of the second input drum 32 is engaged with the first input drum 31 by means of a spline connection 37, so that the second and first input drums 32 and 31 rotate together about a common axis like a single unit. Due to the spline connection 37, the second input drum 32 can axially move relative to the first input drum 31.

Within an outer annular groove of the second input drum 32, there are installed drive plates 33 and a retainer 36 which are axially movable in the annular groove. For this axial movement, a spline connection is employed between the drive plates 33 and an inner surface of the annular groove. A snap ring 36a is fixed to an open end of the annular groove to keep the drive plates 33 and retainer 36 in place.

Within an inner circular recess of the second input drum 32, there is installed the annular pilot clutch 40 which comprises a rotor 41, outer plates 44 and an armature 43. As shown, the annular main clutch 30 and the annular pilot clutch 40 are concentrically arranged about a common axis of the input shaft 5.

The rotor 41, the outer plates 44 and the armature 43 are connected to the inner surface of the inner circular recess through a spline connection, so that these parts 41, 44 and 43 can rotate together with the second input drum 32 about the common axis like a single unit. A snap ring 43a is fixed to a right end of the inner surface of the inner circular recess to keep the parts 41, 44 and 43 in place.

The rotor 41 is formed with an annular groove for spacedly receiving therein an annular electromagnet 42 which is held on a bearing 46. ON/OFF operation of the electromagnet 42 is controlled by the control unit 150.

A plurality of holding brackets 42a (only one is shown) are secured to the annular electromagnet 42, which have respective leading ends engaged with grooves 102c formed in an annular connecting block 102 tightly disposed on a fixed or immovable sleeve member 27 in which a right end of the input shaft 5 is rotatably received. Thus, the annular electromagnet 42 can keep its immovable state even when the rotor 41 rotates. The sleeve member 27 is integrally connected to the clutch housing 23.

Into a front portion of the inner circular recess of the second input drum 32, there extends an input clutch hub 60. The input clutch hub 60 has a cylindrical wall to which driven plates 34, which are alternately mated with the above-mentioned drive plates 33 of the annular main clutch 30, are connected through a spline connection. Each driven plate 34 has both surfaces lined with a frictional material. The cylindrical wall of the input clutch hub 60 has an annular press portion 60a which abuts on a floating plate 35 located just behind the rearmost one of the driven plates 34. Thus, when the input clutch hub 60 is shifted rightward in the drawing, the annular press portion 60a can press the floating plate 35 and the drive and driven plates 33 and 34. If the rearmost one of the driven plates 34 has a left surface which is free of the frictional material, the floating plate 35 may be removed.

The annular cam mechanism 50 comprises a first annular cam member 51, a second annular cam member 52 and cam balls 53. The first annular cam member 51 has a radially outwardly raised wall welded to a radially inwardly projected wall of the input clutch hub 60. The first annular cam member 51 has a splined bore through which a splined end portion 5e of the input shaft 5 is operatively received. As shown, a thrust needle bearing C is operatively disposed between the first annular cam member 51 and a radially inside portion 31a of the first input drum 31. Accordingly, rightward axial movement of the first annular cam member 51 is restrained by a combination including the thrust needle bearing C, the radially inside portion 31a, the bearing 28b and the front cover 28.

The second annular cam member 52 has inner plates 45 of the annular pilot clutch 40 which are axially movably mounted on an outer cylindrical surface through a spline connection. The inner plates 45 are alternatively engaged with outer plates 44 and the armature 43 which are axially movably disposed on an inner cylindrical surface of the second input drum 32 through a spline connection. A thrust needle bearing A is disposed between the outer cylindrical portion of the second annular cam member 52 and a radially inner portion of the rotor 41, so that the second annular cam member 52 and the rotor 41 can axially move together. A needle bearing B is operatively disposed between the sleeve member 27 integrally connected to the clutch housing 23 and an inner cylindrical surface of the rotor 41.

With the above-mentioned construction of the electromagnetic multiple disc clutch EMDC, there can be constituted a power transmission path which comprises generally a driven plate 81 of the torsion damper 80, the input hub 70, the first input drum 31, the second input drum 32, the annular pilot clutch 40, the input clutch hub 60 and the input shaft 5.

As will become apparent hereinafter, when the annular pilot clutch 40 assumes ON condition (viz., engaged condition), the power transmission path is established thus the engine power is transmitted to the input shaft 5. While, when the annular pilot clutch 40 assumes OFF condition (viz., disengaged condition), the power transmission path is not established and thus the engine power is not transmitted to the input shaft 5. More specifically, when the annular pilot clutch 40 assumes ON, the annular main clutch 30 becomes engaged, so that the engine power is transmitted to the output shaft 5 through the annular main clutch 30.

As is seen from FIG. 1, the torsion damper 80, more specifically, a drive plate 82 of the torsion damper 80 is driven by the engine 1. Between the drive and driven plates 82 and 81, there is produced a damping action during rotation of the torsion damper 80.

The power transmission manner in the disc clutch EMDC will be clarified from the following description.

That is, when the annular pilot clutch 40 assumes its ON condition, the engine power transmitted through the above-mentioned power transmission path is applied to the annular cam mechanism 50. Upon this, the cam followers 53 are forced to run in and along respective cam grooves formed on the first and second annular cam members 51 and 52, so that the second annular cam member 52 is shifted leftward in FIG. 2 against a biasing force of a return spring 16 incorporated with the second annular cam member 52. With this leftward shifting of the second annular cam member 52, the second input drum 32, the rotor 41 and the electromagnet 42 are shifted leftward. The leftward shifting of the second input drum 32 brings about the engaged condition of the annular main clutch 30. Thus, under this condition, the engine power on the first input drum 31 is transmitted to the input shaft 5 through the annular main clutch 30 and the input clutch hub 60. As shown, the return spring 16 is held on the first annular cam member 51 by a snap ring 15.

In the following, a lubrication system of the electromagnetic multiple disc clutch EMDC will be described with reference to FIG. 2.

As shown, the sleeve member 27 integrally connected to the clutch housing (23, see FIG. 1) is formed with an oil opening 27a. On the sleeve member 27, there is tightly disposed the connecting block 102 which is formed with both a radially extending oil passage 102b mated with the oil opening 27a of the sleeve member 27 and an axially extending oil passage 102a exposed to a left end portion of the radially inside portion of the rotor 41. The connecting block 102 is positioned above a right end of a receiving chamber in which the countershaft 200 is installed.

The oil passage 102b of the connecting block 102 is connected to an oil pump 100 through an oil pipe 101. The oil pump 100 is driven by an electric motor 100a. The input shaft 5 is formed at its right end portion with an axially extending oil passage 5' which is connected with the oil opening 27a of the sleeve member 27 through an oil inlet opening 5c formed in the input shaft 5. The oil passage 5' has two oil outlet openings, one being a radially extending opening 5a exposed to an inner area of the second annular cam member 52 and the other being a right open end 5b exposed to a recess defined behind the shaft portion 13b of the first input drum 31. The right open end 5b is equipped with an orifice 4 for controlling the amount of oil flowing therethrough.

The shaft portion 13b of the first input drum 31 is formed with an oil passage 31b through which lubrication oil flows from the recess of the shaft portion 13b to a clearance defined between the front cover 28 and the first input drum 31. Thus, when the oil pump 100 is driven by the motor 100a, lubrication oil is forced to flow in the oil passages in such a manner as is indicated by the arrows. With this oil flow, various elements of the electromagnetic multiple disc clutch EMDC are lubricated by the oil as is seen from the drawing.

Although not shown in the drawing, the first and second input drums 31 and 32 are formed with a plurality of openings through which the lubrication oil is led to a clearance defined between the clutch housing 23 (see FIG. 1) and the front cover 28. As is seen from FIG. 1, the lubrication oil contained in the clearance is then led to an oil pan of the transmission case 21 through a drain opening 23a formed in a partition wall of the clutch housing 23.

In the following, operation of the semi-automatic transmission of the present invention will be described with reference to operation steps shown by the flowchart of FIG. 3 and time charts shown by FIGS. 4A and 4B. The operation steps are programmed in the control unit 150.

Figure 3:
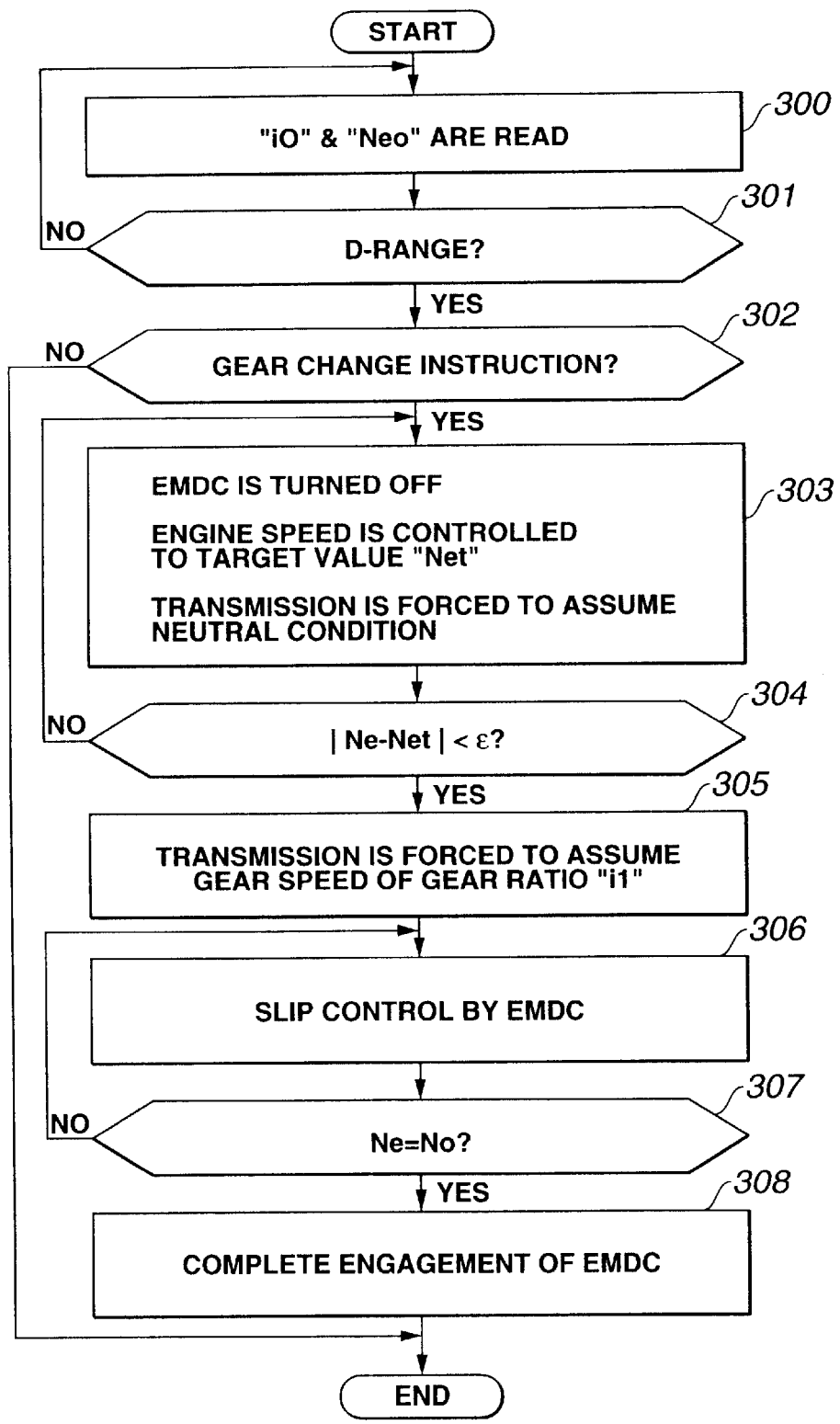
FIG. 3 is a flowchart showing operation steps executed by a control unit for controlling the transmission of the invention.

At step S300 of the flowchart of FIG. 3, the gear ratio "i0" assumed by the transmission proper 20 and the existing engine speed "Ne0" are read. Then, at step S301, judgement is carried out as to whether the transmission proper 20 is in the condition of D-range or not. If NO, the operation flow goes back to step S300. While, if YES, that is, when the transmission is in the condition of D-range, the operation flow goes to step S302. At this step, judgement is carried out as to whether an instruction of gear change from the operational gear speed of gear ratio "i0" to a new operational gear speed of gear ratio "i1" has been issued or not. If NO, the operation flow goes to END. While, if YES, that is, when such instruction has been issued, the operation flow goes to step 303. At this step, the annular pilot clutch 40 is turned OFF to make the disc clutch EMDC OFF (viz., disengaged), and then the engine speed "Ne0" is increased or decreased to a target engine speed "Net" (=Ne0×(i0/i1)) by operating the throttle actuator 2 and the transmission proper 20 is forced to assume a neutral condition by shifting corresponding one of the dog clutch dc1, dc2 or dc3 to its neutral position. As has been mentioned hereinabove, shifting of such dog clutches dc1, dc2 and dc3 is carried out by the pulse motor 3 which is controlled by the control unit 150. Then, at step S304, judgement is carried out as to whether an absolute value of a difference between an actual engine speed "Ne" actually provided after the engine speed control and the target engine speed "Net" is smaller than an allowable value "ε" or not. If NO, the operation flow goes back to step S303. While, if YES, that is, when the absolute value is smaller than the allowable value "ε", the operation flow goes to step S305. At this step, by operating the pulse motor 3, a corresponding dog clutch dc1. dc2 or dc3 is shifted to cause the transmission proper 20 to take the operational gear speed of gear ratio "i1". Then, the operation flow goes to step S306. At this step, a slip control is carried out by the disc clutch EMDC, so that, based on the difference between the engine speed "Ne" appearing after the engine speed control and an existing rotation speed "No" of the input shaft 5 of the transmission proper 20, the input shaft 5 is controlled to have a rotation speed equal to that of the engine 1. The slip control is carried out by alternately turning the annular pilot clutch 40 ON and OFF. Then, the operation flow goes to step S307. At this step, judgement is carried out as to whether the speed "Ne" of the engine 1 and the speed "No" of the input shaft 5 are the same or not. If NO, the operation flow goes back to step S306. While, if YES, that is, when both the rotation speeds "Ne" and "No" are the same, the operation flow goes to step S308. At this step, the annular pilot clutch 40 is turned ON to cause the disc clutch EMDC to assume its engaged or ON condition. In the above-mentioned manner, an up-shift gear change and a down-shift gear change are smoothly made.

As is seen from FIGS. 4A and 4B, the time needed for carrying out the steps from S300 to S308 is about 0.3 to 0.4 seconds. For achieving up-shift gear change, the engine speed "Nt" is decreased, while for achieving down-shift gear change, the engine speed "Nt" is increased. The disc clutch EMDC is controlled to start its slip-control in response to engagement of the dog clutch with a desired gear (higher gear in up-shift or lower gear in down-shift).

As will be understood from the above description, in the semi-automatic transmission of the present invention, the gear change is carried out very quickly due to the effective operation of the electromagnetic multiple disc clutch EMDC. In fact, the response speed of this clutch EMDC to ON/OFF instruction (viz., engine/disengage instruction) is quite higher than that of a conventional hydraulic disc clutch. Furthermore, because the disc clutch EMDC is not actuated by a hydraulic force, the disc clutch EMDC has no disadvantages which the conventional hydraulic disc clutches usually have.

In the semi-automatic transmission of the present invention, the electromagnetic multiple disc clutch EMDC is used as a start clutch. Accordingly, there is no need of using a hydraulic pump for actuating the disc clutch. The disc clutch EMDC can transmit an engine power with a time-lag of first order upon receiving an instruction. That is, the disc clutch EMDC is protected from a serge torque that is inevitably produced in a hydraulic disc clutch.

As has been described hereinabove, when the annular pilot clutch 40 becomes ON, the engaged condition of the annular main clutch 30 is induced due to function of the annular cam mechanism 50. Once the annular main clutch 30 is turned to assume the engaged condition, the engine power is assuredly and smoothly transmitted to the input shaft 5 of the transmission proper 20.

Since, as is seen from FIG. 2, the annular main clutch 30 is concentrically disposed around the annular pilot clutch 40, the axial length of the electromagnetic multiple disc clutch EMDC can be reduced.

Because of provision of the oil passages 102a, 102b 5', 5a, 5b and 5c, various elements of the disc clutch EMDC are effectively lubricated by a lubrication oil that flows in the oil passages. Under rotation of the input shaft 5 (see FIG. 2), the lubrication oil in the passage 5' is thrown radially outward through the opening 5a due to a centrifugal force applied to the oil from the input shaft 5. This brings about an assured oil lubrication of the elements of the disc clutch EMDC.

The annular connecting block 102 mounted on the immovable sleeve member 27 serves as a holding means for holding the annular electromagnet 42 by the function of the holding brackets 42a engaged with the grooves 102c of the block 102 as well as a lubrication oil passage defining means which defines therein the oil passages 102a and 102b. As shown in FIG. 2, the annular connecting block 102, the input shaft 5 and the countershaft 200 are overlapped in a radial direction, and thus, the reduction in axial length of the disc clutch EMDC is much assured.

As is seen from FIG. 1, due to provision of the drain opening 23a in the wall of the clutch housing 23, the elements of the disc clutch EMDC and the elements of the transmission proper 20 can be lubricated by the same lubrication oil.

The entire contents of Japanese Patent Application 2001-224901 filed Jul. 25, 2001 are incorporated herein by reference.

Although the invention has been described above with reference to the embodiment of the invention, the invention is not limited to such embodiment as described above. Various modifications and variations of such embodiment may be carried out by those skilled in the art, in light of the above description.

What is claimed is:

1. A semi-automatic transmission comprising:
    an input shaft;
    a countershaft;
    constantly meshed gears arranged between said input shaft and said countershaft;
    an electrically controlled dog clutch operatively disposed on one said input shaft and said countershaft, said dog clutch being of a type free of a synchronizing mechanism and fastening one of said meshed gears to a corresponding one of said input shaft and said countershaft when operated, thereby to establish a given torque transmission path from said input shaft to said countershaft;
    a control unit which controls said dog clutch in accordance with information signals applied thereto; and
    an electromagnetic multiple disc clutch having an input part adapted to be driven by an engine and an output part connected to said input shaft.

2. A semi-automatic transmission as claimed in claim 1, in which said electromagnetic multiple disc clutch is of a torque cam type.

3. A semi-automatic transmission as claimed in claim 1, in which said electromagnetic multiple disc clutch is of a wet type and comprises:
    an input drum adapted to be driven by the engine;
    an input clutch hub connected to said input shaft to rotate therewith;
    a main clutch which selectively assumes an engaged condition wherein said input drum and said input clutch hub are engaged and a disengaged condition wherein said input drum and aid input clutch hub are disengaged;
    a pilot clutch which selectively assumes engaged and disengaged conditions; and
    a torque cam mechanism which becomes operated upon receiving a transmission torque generated when said pilot clutch assumes the engaged condition, said torque cam mechanism causing said main clutch to assume the engaged condition when receiving through a biasing mechanism thereof a cam thrust force which is generated when said pilot clutch becomes operated to assume the engaged condition.

4. A semi-automatic transmission as claimed in claim 3, in which said main clutch is concentrically disposed around said pilot clutch thereby to constitute a radially overlapping arrangement therebetween.

5. A semi-automatic transmission as claimed in claim 1, further comprising:
    a clutch housing which houses therein said multiple disc clutch;
    an electric oil pump which is arranged to transport a lubrication oil in a transmission mechanism toward said multiple disc clutch;
    an annular connecting block immovably disposed about said input shaft and having an oil passage which has an opening exposed to an interior of said multiple disc clutch;
    an oil pipe extending from an outlet port of said electric oil pump to said oil passage of said annular connecting block; and
    an axially extending oil passage formed in said input shaft, said axially extending oil passage having an inlet port connectable with said oil passage of said annular connecting block and an outlet port exposed the interior of said multiple disc clutch.

6. A semi-automatic transmission as claimed in claim 5, in which said annular connecting block is tightly disposed on a sleeve member in which said input shaft is rotatably disposed, said sleeve member being integrally connected to said clutch housing, in which an end of said countershaft is located in the vicinity of said annular connecting block, and in which said annular connecting block is provided with a holder means to which an annular electromagnet of said multiple disc clutch is secured.

7. A semi-automatic transmission as claimed in claim 5, further comprises a transmission housing which houses therein said transmission mechanism, said transmission housing and said clutch housing being partitioned by a partition wall arranged therebetween, said partition wall being formed with a drain opening through which the lubrication oil in the clutch housing is led to the transmission housing.

8. A semi-automatic transmission as claimed in claim 1, further comprising:
    a shift drum actuator which electrically drives said dog clutch; and
    a throttle actuator which controls rotation speed of the engine,
    in which said control unit comprises:
        a first control section which controls the engaged condition of said multiple disc clutch; a second control section which controls the engagement/disengagement of the dog clutch; a third control section which controls the throttle actuator; and a fourth control section which judges whether a difference between an existing rotation speed of the engine and a target rotation speed of the engine is within a given value or not, and
        in which said control unit is configured to carry out operations in order in that said first control section causes said multiple disc clutch to assume the disengaged condition upon receiving a gear change instruction, said second control section causes said dog clutch to assume the disengaged condition, said third control section controls the engine speed to a target engine speed that would be provided when the gear change is over, said fourth control section issues an instruction signal to said first control section in such a manner that when the existing engine speed becomes substantially equal to said target engine speed, the engaging torque of said multiple disc clutch is controlled based on a difference between the existing engine speed and the rotation speed of the input shaft, said second control section causes said dog clutch to establish a new gear position, and first control section causes the multiple disc clutch to assume the full-engaged condition.

9. A semi-automatic transmission comprising:
    an input shaft having a first group of gears rotatably disposed thereon;
    a countershaft having a second group of gears tightly disposed thereon, said second group of gears being constantly and respectively engaged with said first group of gears;

an electrically controlled dog clutch operatively disposed on said input shaft, said dog clutch functioning to fasten one of said first group of gears to said input shaft when operated;

an electromagnetic multiple disc clutch having an input part adapted to be driven by an engine and an output part connected to said input shaft; and a control unit which controls both said dog clutch and said electromagnetic multiple disc clutch upon receiving a gear change instruction.

10. A semi-automatic transmission as claimed in claim 9, in which said electromagnetic multiple disc clutch is of a wet type and comprises:

an input drum adapted to be driven by said engine;

an input clutch hub connected to said input shaft to rotate therewith;

a main clutch selectively assuming an engaged condition wherein said input drum and said input clutch hub are engaged and a disengaged condition wherein said input drum and said input clutch hub are disengaged;

a pilot clutch which selectively assumes an engaged condition and a disengaged condition; and a cam mechanism which forces said main clutch to assume said engaged condition when said pilot clutch assumes said engaged condition.

11. A semi-automatic transmission as claimed in claim 10, in which said torque cam mechanism comprises:

a first cam member connected to said input drum;

a second cam member incorporated with said pilot clutch; and bearing balls operatively disposed between said first and second cam members, wherein when said pilot clutch is electrically energized, said second cam member becomes fixed to said input drum thereby to induce a latched engagement between said first and second cam members due to function of said bearing balls.

12. A semi-automatic transmission as claimed in claim 11, in which said main clutch assumes said engaged condition when said latched engagement between said first and second cam members is induced.

13. A semi-automatic transmission as claimed in claim 12, in which said engaged condition of said main clutch is induced when said second cam member is axially moved in response to the latched engagement between said first and second cam members.

14. A semi-automatic transmission as claimed in claim 10, in which said main clutch is concentrically arranged around said pilot clutch.

15. A semi-automatic transmission as claimed in claim 9, further comprising:

a third group of gears tightly disposed on said input shaft;

a fourth group of gears rotatably disposed on said countershaft; and another dog clutch operatively disposed on said counter shaft and functioning to fasten one of said fourth group of gears to said countershaft when operated.

16. A semi-automatic transmission as claimed in claim 9, in which said electromagnetic multiple disc clutch is of a wet type, said transmission further comprising:

a partition wall by which a first container chamber containing said electromagnetic multiple disc clutch and a second container chamber containing said first and second groups of gears are separated;

a port formed in said partition wall;

an oil pump; and a lubrication oil passage extending from said oil pump to said first container chamber, so that upon operation of said oil pump, a lubrication oil is forced to flow from said first container chamber to said second container chamber through said port.

17. A semi-automatic transmission as claimed in claim 16, in which said lubrication oil passage comprises:

an axial oil passage axially extending in said input shaft; and at least one oil opening formed in said input shaft and extending radially outward from said axial oil passage to be exposed to elements of said electromagnetic multiple disc clutch, wherein upon rotation of the input shaft, the lubrication oil in the axial oil passage is thrown radially outward through the oil opening due to a centrifugal force.

18. A semi-automatic transmission as claimed in claim 17, in which said lubrication oil passage further comprises:

a first passage extending from said oil pump;

a second passage defined in an annular connecting block which is immovably disposed about said input shaft, said second passage being connected to said first passage; and a third passage formed in said input shaft to connect said second passage to said axial oil passage.

19. A semi-automatic transmission as claimed in claim 10, in which said control unit is configured to carry out:

turning said pilot clutch OFF when a speed change instruction is applied;

controlling en engine speed to a target value;

operating said dog clutch to fasten another one of said first group gears to said input shaft;

causing said main clutch to carry out a slip control by alternately turning said pilot clutch ON and OFF thereby to establish a synchronization between the engine speed and the speed of said input shaft; and causing said main clutch to be fully engaged by turning said pilot clutch ON.

20. A semi-automatic transmission comprising:

an input shaft having a first group of gears rotatably disposed thereon and a third group of gears tightly disposed thereon;

a countershaft having a second group of gears tightly disposed thereon and a fourth group of gears rotatably disposed thereon, said second and fourth groups of gears being constantly and respectively engaged with said first and third groups of gears;

an electrically controlled first dog clutch operatively disposed on said input shaft, said first dog clutch functioning to fasten one of said first group of gears to said input shaft when operated;

an electrically controlled second dog clutch operatively disposed on said countershaft, said second dog clutch functioning to fasten one of said third group of gears to said countershaft when operated;

a wet type electromagnetic multiple disc clutch having an input part adapted to be driven by an engine and an output part connected to said input shaft; and a control unit which controls said first and second dog clutches and said electromagnetic multiple disc clutch upon receiving a gear change instruction, wherein said wet type electromagnetic multiple disc clutch comprises:

an input drum adapted to be driven by said engine;

an input clutch hub connected to said input shaft to rotate therewith;

an annular main clutch selectively assuming an engine condition wherein said input drum and said input clutch hub are engaged and a disengaged condition wherein said input drum and said input clutch hub are disengaged;

an annular pilot clutch which selectively assumes an engaged condition and a disengaged condition; and an annular cam mechanism which forces said annular main clutch to assume said engaged condition when said annular pilot clutch assumes said engaged condition, wherein said annular pilot clutch and said annular cam mechanism are concentrically received within said annular main clutch with respect to an axis of said input shaft.

* * * * *